United States Patent
Mronga et al.

(10) Patent No.: US 7,387,669 B2
(45) Date of Patent: Jun. 17, 2008

(54) LUSTER PIGMENTS HAVING A PRONOUNCED GLITTERING EFFECT

(75) Inventors: Norbert Mronga, Dossenheim (DE); Raimund Schmid, Neustadt (DE); Oliver Seeger, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/577,468

(22) PCT Filed: Oct. 23, 2004

(86) PCT No.: PCT/EP2004/011996

§ 371 (c)(1),
(2), (4) Date: Apr. 27, 2006

(87) PCT Pub. No.: WO2005/042643

PCT Pub. Date: May 12, 2005

(65) Prior Publication Data

US 2007/0034112 A1 Feb. 15, 2007

(30) Foreign Application Priority Data

Oct. 28, 2003 (DE) ................................ 103 50 419

(51) Int. Cl.
*C09B 67/50* (2006.01)
(52) U.S. Cl. .................... 106/413; 106/31.6; 106/415; 106/404; 106/456; 523/200

(58) Field of Classification Search ............... 106/31.6, 106/415, 404, 456, 413; 523/200
See application file for complete search history.

(56) References Cited

U.S. PATENT DOCUMENTS

| | | | | |
|---|---|---|---|---|
| 4,328,042 A | * | 5/1982 | Ostertag et al. ............. | 106/403 |
| 6,596,070 B1 | * | 7/2003 | Schmidt et al. ............. | 106/417 |
| 2003/0051634 A1 | * | 3/2003 | Takahashi .................... | 106/403 |
| 2006/0058419 A1 | * | 3/2006 | Nagano ....................... | 523/160 |

FOREIGN PATENT DOCUMENTS

| | | |
|---|---|---|
| DE | 198 36 810 | 2/2000 |
| EP | 0 033 457 | 8/1981 |
| EP | 0 655 486 | 5/1995 |
| EP | 1 270 684 | 1/2003 |

OTHER PUBLICATIONS

U.S. Appl. No. 10/577,468, filed Apr. 27, 2006, Mronga et al.
U.S. Appl. No. 08/340,411, filed Nov. 15, 1994, Mronga et al.
U.S. Appl. No. 08/639,705, filed Apr. 29, 1996, Mronga et al.

* cited by examiner

*Primary Examiner*—J. A. Lorengo
*Assistant Examiner*—Pegah Parvini
(74) *Attorney, Agent, or Firm*—Oblon, Spivak, McClelland, Maier & Neustadt, P.C.

(57) ABSTRACT

Luster pigments having pronounced sparkle which are based on aluminum platelets which have been coated with iron oxide and have in the precoated state an average platelet size from 8 to 30 μm, an average platelet thickness from 300 to 600 nm and an aspect ratio from 15 to 70.

11 Claims, No Drawings

LUSTER PIGMENTS HAVING A PRONOUNCED GLITTERING EFFECT

The present invention relates to novel luster pigments having pronounced sparkle which are based on aluminum platelets which have been coated with iron oxide and have in the precoated state an average platelet size from 8 to 30 μm, an average platelet thickness from 300 to 600 nm and an aspect ratio from 15 to 70.

This invention also relates to the use of these luster pigments for coloration of coatings, paints, printing inks, plastics, ceramic compositions and glazes and decorative cosmetic preparations.

Iron oxide as used herein is to be understood as meaning α-iron(III) oxide in particular. However, the term "iron oxide" shall also comprise mixtures of α-iron(III) oxide with minor amounts of γ-iron(III) oxide and/or magnetite ($Fe_3O_4$).

Platelet-shaped aluminum pigments having a coating of iron oxide are well known and described in EP-A-33 457 for example. They belong to the class of effect pigments which, by virtue of their particular color properties, have found wide use in the coloration of coatings, paints, printing inks, plastics, ceramic compositions and glazes and decorative cosmetic preparations.

Effect pigments owe their particular optical effect to the angle-selective reflection of light at their platelet-shaped particles which are in a parallel arrangement in the application medium. This creates angle-dependent light-dark effects or else color changes, known as flops, depending on the chemical construction of the pigment.

Iron oxide coated aluminum pigments derive their particular optical profile from a combination of specular reflection at the surface of the aluminum platelet, selective light absorption in the iron oxide layer and light interference at the upper and lower surfaces of the iron oxide layer.

Light interference leads to the perception of a color which is determined by the thickness of the iron oxide coating layer. Dry pigment powders therefore exhibit the following hues in air with increasing iron oxide layer thickness which are classified as due to 1st order or 2nd order interference:

1st order interference colors: pale yellow (10 nm), gold (21 nm), reddish-gold (28 nm) red (35 nm), violet (44 nm), grayish-violet (53 nm);

2nd order interference colors: grayish-yellow (63 nm), grayish-gold (75 nm), reddish-gold (88 nm), red-gold (104 nm), red (122 nm).

Pigments having an iron oxide layer thickness of about 35 nm are remarkable in that they are red as a powder, but orange in an application medium, a coating for example.

Iron oxide coated aluminum pigments are very bright and high hiding, which is why they are particularly widely used in automotive top coatings. The pigments customarily used in that field are based on aluminum platelets having average particle sizes from 8 to 35 μm and preferably from 13 to 25 μm and average particle thicknesses of about 80 to 200 nm, corresponding to a specific surface area of 3 to 8 $m^2/g$ (measured in nitrogen after BET) and size/thickness (aspect) ratios from 100 to 175. These pigments exhibit a metallic mirror effect which is highly chromatic and appears very homogeneous and "smooth".

However, there is an increasing demand for effect coatings which combine high chroma and brightness of color with a pronounced sparkle. Direct sunlight in particular shall create the impression of paintwork which is seemingly alive in that it varies with the viewing angle and has a multiplicity of colored sites of luster. At the same time, however, important performance properties, such as high hiding power on the part of the effect pigments used, processibility of coatings on large-scale paintlines (ring line stability) and a high DORI (distinctness of reflected image) on the part of the ready-coated article.

Coarsely divided effect pigments having an average particle diameter above about 40 to 50 μm are known to exhibit the desired sparkle when incorporated in a coating, but their hiding power is appreciably lower, they often clog the paint spray nozzles and, finally, DORI is not satisfactory, which is why these pigments are not suitable for use.

The invention therefore has for its object to provide effect pigments which exhibit the desired optical properties, especially very bright hues, hiding power and sparkle in the application medium while at the same time meeting the performance requirements for use on large-scale paintlines in particular.

We have found that this object is achieved by luster pigments having pronounced sparkle which are based on aluminum platelets which have been coated with iron oxide and have in the precoated state an average platelet size from 8 to 30 μm, an average platelet thickness from 300 to 600 nm and an aspect ratio from 15 to 70.

The luster pigments of the invention are preferably based on aluminum platelets having an aspect ratio from 25 to 55.

Luster pigments of the invention are more preferably based on aluminum platelets having an average platelet size from 13 to 25 μm, an average platelet thickness from 350 to 550 nm and an aspect ratio from 25 to 55.

The average thickness of the aluminum platelets is easy to calculate from their BET specific surface area by the following formula:

$$S = [2000(2\ h+d)]/(d\ h\ \rho)$$

where
S: BET specific surface area in $m^2/g$
h: average platelet thickness in nm
d: average platelet diameter (size) in nm
ρ: specific density of aluminum in $g/cm^3$.

It was unforeseeable that the relatively finely divided luster pigments of the invention would exhibit the desired sparkling effect in use because previous experience suggested that only coarsely divided luster pigments are capable of creating these effects.

In particularly useful luster pigments of the invention the aluminum platelets have been coated with an iron oxide layer having a geometric thickness from 18 to 25 nm, from 30 to 40 nm or from 110 to 140 nm. These pigments, when incorporated in a coating for example, exhibit particularly bright hues, namely a particularly bright gold, orange or red, respectively.

The luster pigments of the invention can be produced by known processes. They are particularly advantageous to obtain by the chemical vapor deposition (CVD) process described in EP-A-33 457 for example, through oxidative decomposition of iron carbonyl in the gas phase in the presence of fluidized aluminum platelets. However, they can also be produced wet chemically by hydrolysis of suitable iron compounds, for example inorganic salts, such as iron nitrate, iron sulfate and iron chloride, or, with or without simultaneous oxidation, of other especially organic iron compounds, such as iron acetate, iron formate, iron citrate, iron carbonyl, iron acetylacetonate and ferrocene, in the presence of aluminum platelets suspended in water and/or organic solvents and with or without subsequent calcination.

If desired, luster pigments of the invention can be subjected to an additional treatment in order that they may be especially stabilized for use in aqueous systems, for example waterborne coatings. A similar treatment of the aluminum platelets themselves is also advisable prior to the wet-chemical coating with iron oxide. The luster pigments of the invention can accordingly additionally comprise a corrosion-inhibiting coating directly on the aluminum platelets and/or as an exterior layer on the iron oxide layer.

A number of stabilizing measures are known for this purpose that employ especially oxidic chromium, molybdenum, phosphorus, silicon, zirconium and/or aluminum compounds as corrosion-inhibiting agents. Examples include the action of chromic acid/chromate or molybdenic acid/molybdate, the overcoating with additional protective layers, for example of silicon dioxide/silicon oxide hydrate, zirconium dioxide/zirconium oxide hydrate, aluminum oxide/aluminum oxide hydrate, phosphites and/or phosphates, and the conjoint application with corrosion-inhibiting substances, such as organic nitro compounds and organic and/or inorganic compounds of tri- or pentavalent phosphorus.

The luster pigments of the invention are very useful for coloration of paints, coatings, printing inks, especially security printing inks, plastics, ceramic compositions and glazes and decorative cosmetic preparations. They are notable for high chroma, high brilliance, high luster, high distinctness of reflected image (DORI), high hiding power and the desired sparkle and are readily processible, especially on large-scale paintlines.

The luster pigments of the invention are particularly important for coloration of coatings, which may be solvent containing or waterborne. A particularly important application medium is automotive coatings. They are especially useful for two coat metallics, but also endow one coat and multicoat metallics with the desired sparkle.

The luster pigments of the invention can be used alone or in combination with other pigments from the group of effect pigments, fluorescent colorants, hiding and transparent chromatic, white and black pigments.

The combination with prior art effect pigments of the same hue is particularly attractive in that it enables the degree of sparkle to be adjusted from nonexistent to marked via the choice of mixing ratio.

Examples of conventional effect pigments to be combined include titanium dioxide or iron dioxide coated mica pigments (pearl luster pigments), titanium dioxide or iron oxide coated aluminum pigments, titanium dioxide or iron oxide coated aluminum oxide platelets and uncoated aluminum flakes. There will be particular interest in effect pigments having a pronounced angle-dependent change of color, such as hologram type pigments, pigments based on chiral liquid-crystalline compounds and platelet-shaped pigments which have a multilayered construction and which may be based on fully enrobed substrate platelets for example of aluminum, doped iron oxide, silicon dioxide, synthetic or natural silicates, such as mica, or glass, such as aluminum and iron oxide platelets coated with silicon dioxide and iron oxide, mica platelets coated with titanium dioxide, silicon dioxide and a metal, with iron oxide, silicon dioxide and a metal, with iron oxide, silicon dioxide and titanium dioxide, with titanium dioxide, silicon dioxide and iron oxide, with a metal, silicon dioxide and titanium dioxide, with a metal, silicon dioxide or iron oxide or with a metal, silicon dioxide and a metal, or consist of multilayer systems which comprise for example the layer sequences of iron oxide/ silicon dioxide/iron oxide, iron oxide/titanium dioxide/iron oxide, titanium dioxide/silicon dioxide/titanium dioxide, chromium/magnesium fluoride/aluminum/magnesium fluoride/chromium or chromium/magnesium fluoride/chromium.

EXAMPLES

Example 1

1.5-kg of an aluminum powder having an average platelet size of 18 µm and an average platelet thickness of 430 nm were fluidized by a fluidizing gas stream of 1000 l/h of nitrogen in a cylindrical fluidized bed reactor made of glass (15 cm in diameter, 80 cm in length), fitted at its lower end with a glass frit and a fluidizing gas inlet and at its upper end with a lid having built-in filter socks and having an electrical heating tape wound around the glass wall. After the reactor had been heated to 200° C., the fluidizing nitrogen was admixed with sufficient air for the gas mixture in the reactor to comprise about 2.5% by volume of oxygen. A nozzle inserted into the reactor on the side directly above the frit was then used to introduce 300 ml of iron pentacarbonyl, which had previously been vaporized in a heated feed vessel, continuously into the reactor for 6 h by means of a nitrogen carrier gas stream of 200 l/h, the iron pentacarbonyl decomposing in the reactor to form iron(III) oxide which became deposited on the aluminum platelets.

A bright pigmentary powder having a golden interference color was obtained that, on application in a solvent-containing CAB coating system on black and white cardboard, exhibited a bright golden color, good hiding power and pronounced sparkling.

Example 2

Example 1 was repeated except that 0.8 kg of the aluminum powder was coated with iron oxide by using 230 ml of iron pentacarbonyl within 5 h.

A bright pigmentary powder having a red interference color was obtained that, on application in a solvent-containing CAB coating system on black and white cardboard, exhibited a bright orange color, good hiding power and pronounced sparkling.

Example 3

Example 1 was repeated except that the aluminum powder was coated with iron oxide by using 1665 ml of iron pentacarbonyl within 35 h.

A bright pigmentary powder having a red interference color was obtained that, on application in a solvent-containing CAB coating system on black and white cardboard, exhibited a bright red color, good hiding power and pronounced sparkling.

Example 4

Example 1 was repeated except that 1.5 kg of an aluminum powder having an average platelet size of 22 µm and an average platelet thickness of 550 nm was coated with iron oxide by using 25 ml of iron pentacarbonyl within 5 h.

A bright pigmentary powder having a golden interference color was obtained that, on application in a solvent-containing CAB coating system on black and white cardboard, exhibited a bright golden color, good hiding power and pronounced sparkling.

Example 5

Example 1 was repeated except that 1.5 kg of the aluminum powder from example 4 was coated with iron oxide by using 330 ml of iron pentacarbonyl within 7 h.

A bright pigmentary powder having a red interference color was obtained that, on application in a solvent-containing CAB coating system on black and white cardboard, exhibited a bright orange color, good hiding power and pronounced sparkling.

Example 6

Example 1 was repeated except that 1.5 kg of the aluminum powder from example 4 was coated with iron oxide by using 1250 ml of iron pentacarbonyl within 25 h.

A bright pigmentary powder having a red interference color was obtained that, on application in a solvent-containing CAB coating system on black and white cardboard, exhibited a bright red color, good hiding power and pronounced sparkling.

We claim:

1. Luster pigments having pronounced sparkle consisting essentially of aluminum platelets coated with iron oxide, wherein an average platelet size of the aluminum platelets in a precoated state is from 8 to 30 μm, an average platelet thickness of the aluminum platelets in the precoated state is from 300 to 600 nm and an aspect ratio of the aluminum platelets in the precoated state is from 15 to 70.

2. Luster pigments according to claim 1 wherein the aspect ratio of the aluminum platelets in the precoated state is from 25 to 55.

3. Luster pigments according to claim 1 wherein the average platelet size of the aluminum platelets in the precoated state is from 13 to 25 μm, the average platelet thickness of the aluminum platelets in the precoated state is from 350 to 550 nm and the aspect ratio of the aluminum platelets in the precoated state is from 25 to 55.

4. Luster pigments according to claim 1 wherein a geometric layer thickness of the iron oxide coating is from 18 to 25 nm.

5. Luster pigments according to claim 1 wherein a geometric layer thickness of the iron oxide coating is from 30 to 40 nm.

6. Luster pigments according to claim 1 wherein a geometric layer thickness of the iron oxide coating is from 110 to 140 nm.

7. Stabilized Luster pigments comprising the luster pigments according to claim 1 and a corrosion-inhibiting coating of oxidic chromium, molybdenum, phosphorus, silicon, zirconium and/or aluminum compounds, wherein the corrosion inhibiting coating is directly on the aluminum platelets and/or on the iron oxide layer.

8. A method for coloration of coatings, paints, printing inks, plastics, ceramic compositions and glazes and decorative cosmetic preparations comprising adding the luster pigments according to claim 1.

9. A method for coloration of one coat, two coat or multicoat metallics comprising applying one, two or multicoats comprising the luster pigments according to claim 1.

10. The method for coloration of coatings, paints, printing inks, plastics, ceramic compositions and glazes and decorative cosmetic preparations according to claim 8, wherein the adding the luster pigments according to claim 1 comprises adding the luster pigments in combination with other pigments selected from the group consisting of effect pigments, fluorescent colorants, hiding and transparent chromatic, white and black pigments.

11. The method for coloration of coatings, paints, printing inks, plastics, ceramic compositions and glazes and decorative cosmetic preparations comprising adding the stabilized luster pigments according to claim 7.

\* \* \* \* \*